United States Patent
Hwang et al.

(10) Patent No.: US 7,931,778 B2
(45) Date of Patent: Apr. 26, 2011

(54) LECITHIN-STARCHES COMPOSITIONS, PREPARATION THEREOF AND PAPER PRODUCTS HAVING OIL AND GREASE RESISTANCE, AND/OR RELEASE PROPERTIES

(75) Inventors: Ki-Oh Hwang, Cedar Rapids, IA (US); Jagannadh V. Satyavolu, Cedar Rapids, IA (US); Kevin Ray Anderson, Cedar Rapids, IA (US); James Donald Steinke, Marion, IA (US)

(73) Assignee: Cargill, Incorporated, Wayzata, MN (US)

( * ) Notice: Subject to any disclaimer, the term of this patent is extended or adjusted under 35 U.S.C. 154(b) by 806 days.

(21) Appl. No.: 11/586,475

(22) Filed: Oct. 25, 2006

(65) Prior Publication Data

US 2007/0102129 A1 May 10, 2007

Related U.S. Application Data

(60) Provisional application No. 60/733,636, filed on Nov. 4, 2005.

(51) Int. Cl.
*D21H 17/28* (2006.01)
*D21H 21/14* (2006.01)
*D21H 23/04* (2006.01)
*D21H 23/22* (2006.01)
*C08L 3/04* (2006.01)
*C08L 3/10* (2006.01)

(52) U.S. Cl. ........ 162/175; 162/158; 162/180; 162/184; 162/185; 106/162.1; 106/206.1; 106/207.1; 106/208.1

(58) Field of Classification Search ............... 162/158, 162/175, 180, 184, 185; 106/162.1, 206.1, 106/207.1, 208, 1
See application file for complete search history.

(56) References Cited

U.S. PATENT DOCUMENTS

| | | | |
|---|---|---|---|
| 2,324,529 A * | 7/1943 | Sidney | 162/175 |
| 3,935,008 A | 1/1976 | Lind | |
| 3,940,519 A | 2/1976 | Helmer | |
| 3,950,975 A | 4/1976 | Izumi | |
| 3,959,516 A | 5/1976 | Warkentin | |
| 3,966,997 A | 6/1976 | Warkentin | |
| 4,011,389 A | 3/1977 | Langdon | |
| 4,013,480 A | 3/1977 | Chumbley | |
| 4,035,235 A | 7/1977 | Richards | |
| 4,056,494 A | 11/1977 | Kronstein | |
| 4,060,506 A | 11/1977 | Verbanac | |
| 4,061,610 A | 12/1977 | Glowaky | |
| 4,091,170 A | 5/1978 | Godfrey | |
| 4,120,986 A | 10/1978 | Lynn | |
| 4,126,591 A | 11/1978 | Kronstein | |
| 4,173,488 A | 11/1979 | Vassiliades | |
| 4,178,393 A | 12/1979 | Gregersen | |
| 4,207,347 A | 6/1980 | D'Atri | |
| 4,239,592 A | 12/1980 | Gaspar | |
| 4,262,058 A | 4/1981 | Saunders | |
| 4,268,069 A | 5/1981 | Stolfo | |
| 4,276,207 A | 6/1981 | Lester | |
| 4,288,460 A | 9/1981 | Ciliberto | |
| T101,304 I4 | 12/1981 | Musser | |
| 4,333,849 A | 6/1982 | Pack | |
| 4,387,221 A | 6/1983 | Tessler | |
| 4,397,870 A | 8/1983 | Sloviter | |
| 4,398,954 A | 8/1983 | Stolfo | |
| 4,420,496 A | 12/1983 | Hanson, Jr. | |
| 4,425,164 A | 1/1984 | Bliznak | |
| 4,451,387 A | 5/1984 | Tai | |
| 4,501,726 A | 2/1985 | Schroder | |
| 4,501,757 A | 2/1985 | Smith | |
| 4,529,608 A | 7/1985 | Szejtli | |
| 4,569,847 A | 2/1986 | Andrews | |
| 4,587,154 A | 5/1986 | Hotchkiss | |
| 4,614,546 A | 9/1986 | Schroer | |
| 4,652,393 A | 3/1987 | Ely | |
| 4,686,119 A | 8/1987 | Nojima | |
| 4,687,519 A | 8/1987 | Trzasko | |
| 4,717,646 A | 1/1988 | Giorgi | |
| 4,721,655 A | 1/1988 | Trzasko | |
| 4,721,709 A | 1/1988 | Seth | |
| 4,731,081 A | 3/1988 | Tiffany | |
| 4,758,279 A | 7/1988 | Hasuly | |
| 4,762,721 A | 8/1988 | Holscher | |
| 4,801,544 A | 1/1989 | Munk | |
| 4,818,292 A | 4/1989 | Iley | |
| 4,859,509 A | 8/1989 | Hasuly | |
| 4,872,951 A * | 10/1989 | Maliczyszyn et al. | 162/135 |
| 4,882,059 A | 11/1989 | Wong | |
| 4,964,915 A | 10/1990 | Blixt | |
| 4,977,252 A | 12/1990 | Chiu | |
| 5,000,198 A | 3/1991 | Nakajima | |
| 5,006,140 A | 4/1991 | Loercks | |
| 5,013,763 A | 5/1991 | Tubesing | |
| 5,026,555 A | 6/1991 | Killeen | |
| 5,055,541 A | 10/1991 | Floyd | |
| 5,059,642 A | 10/1991 | Jane | |
| 5,063,090 A | 11/1991 | Wannlund | |
| 5,106,418 A | 4/1992 | Szepfoldi | |
| 5,116,927 A | 5/1992 | Floyd | |
| 5,122,385 A | 6/1992 | Daher | |
| 5,135,761 A | 8/1992 | Dave | |
| 5,163,931 A | 11/1992 | Aldrett | |

(Continued)

*Primary Examiner* — Matthew J Daniels
*Assistant Examiner* — Dennis Cordray

(57) ABSTRACT

The present disclosure relates to lecithin containing starch compositions. The disclosure also relates to processes for preparing the lecithin-containing starch compositions. Further, the disclosure relates to uses of the lecithin-containing compositions in the preparation of paper products that have oil and grease resistant properties, and/or have release properties. Further, the disclosure relates to paper products that include lecithin-containing compositions and to paper products resulting from the processes herein.

50 Claims, No Drawings

U.S. PATENT DOCUMENTS

| | | | |
|---|---|---|---|
| 5,185,176 | A | 2/1993 | Chiu |
| 5,194,094 | A | 3/1993 | Ammeraal |
| 5,198,254 | A | 3/1993 | Nisperos-Carriedo |
| 5,207,827 | A | 5/1993 | Tokarz |
| 5,256,458 | A | 10/1993 | Oxley |
| 5,262,187 | A | 11/1993 | Hahn |
| 5,290,567 | A | 3/1994 | Schneider |
| 5,296,021 | A | 3/1994 | Clapp |
| 5,304,385 | A | 4/1994 | Wilhoit |
| 5,358,784 | A | 10/1994 | Hammer |
| 5,374,434 | A | 12/1994 | Clapp |
| 5,384,170 | A | 1/1995 | Bastioli |
| 5,413,815 | A | 5/1995 | Williams |
| 5,431,719 | A | 7/1995 | Clapp |
| 5,439,697 | A | 8/1995 | Gonzalez-Sanz |
| 5,445,950 | A | 8/1995 | Kobayashi |
| 5,462,983 | A | 10/1995 | Bloembergen |
| 5,496,861 | A | 3/1996 | Rouse |
| 5,500,465 | A | 3/1996 | Krishnan |
| 5,512,378 | A | 4/1996 | Bastioli |
| 5,514,404 | A | 5/1996 | Zimmerman |
| 5,532,010 | A | 7/1996 | Spanier |
| 5,567,456 | A | 10/1996 | Clapp |
| 5,576,049 | A | 11/1996 | Haas |
| 5,595,631 | A | 1/1997 | Tsai |
| 5,603,979 | A | 2/1997 | Lasdon |
| 5,609,904 | A | 3/1997 | Koh |
| 5,654,039 | A | 8/1997 | Wenzel |
| 5,658,378 | A | 8/1997 | Tsai |
| 5,672,699 | A | 9/1997 | Billmers |
| 5,686,133 | A | 11/1997 | Amidon |
| 5,705,536 | A | 1/1998 | Tomka |
| 5,753,310 | A | 5/1998 | Bakalar |
| 5,797,984 | A | 8/1998 | Billmers |
| 5,834,022 | A | 11/1998 | Amidon |
| 5,837,383 | A | 11/1998 | Wenzel |
| 5,844,023 | A | 12/1998 | Tomka |
| 5,851,275 | A | 12/1998 | Amidon |
| 5,855,217 | A | 1/1999 | John |
| 5,858,933 | A | 1/1999 | Nikoloff |
| 5,869,647 | A | 2/1999 | Narayan |
| 5,885,617 | A | 3/1999 | Jordan |
| 5,935,826 | A | 8/1999 | Blue |
| 5,945,468 | A | 8/1999 | Atkinson |
| 5,961,708 | A | 10/1999 | Zetter |
| 5,976,598 | A | 11/1999 | Akkaway |
| 5,980,968 | A | 11/1999 | Booth |
| 6,001,166 | A | 12/1999 | Ettl |
| 6,001,473 | A | 12/1999 | Atkinson |
| 6,007,614 | A | 12/1999 | Billmers |
| 6,010,822 | A | 1/2000 | Huang |
| 6,037,466 | A | 3/2000 | Maliczyszyn |
| 6,066,368 | A | 5/2000 | Billmers |
| 6,068,863 | A | 5/2000 | Dupart |
| 6,086,917 | A | 7/2000 | Trubiano |
| 6,086,940 | A | 7/2000 | Axelrod |
| 6,103,802 | A | 8/2000 | Zhang |
| 6,132,769 | A | 10/2000 | Remon |
| 6,143,113 | A | 11/2000 | Berube |
| 6,147,028 | A | 11/2000 | Rizzi |
| 6,162,623 | A | 12/2000 | Grote |
| 6,190,591 | B1 | 2/2001 | van Lengerich |
| 6,210,743 | B1 | 4/2001 | Clapp |
| 6,214,907 | B1 | 4/2001 | Tomka |
| 6,235,815 | B1 | 5/2001 | Loercks |
| 6,242,102 | B1 | 6/2001 | Tomka |
| 6,248,164 | B1 | 6/2001 | Hakansson |
| 6,291,075 | B1 | 9/2001 | Zhang |
| 6,340,527 | B1 | 1/2002 | Van Soest |
| 6,372,361 | B1 | 4/2002 | Mackewicz |
| 6,448,323 | B1 | 9/2002 | Jordan |
| 6,472,497 | B2 | 10/2002 | Loercks |
| 6,495,163 | B1 | 12/2002 | Jordan |
| 6,515,175 | B2 | 2/2003 | Mueller |
| 6,521,088 | B1 | 2/2003 | Richardson |
| 6,541,556 | B1 | 4/2003 | Berube |
| 6,566,470 | B2 | 5/2003 | Kantamneni |
| 6,582,509 | B2 | 6/2003 | Malkki |
| 6,585,859 | B1 | 7/2003 | Hakansson |
| 6,599,550 | B2 | 7/2003 | Merchant |
| 6,610,392 | B1 | 8/2003 | Ramesh |
| 6,613,376 | B2 | 9/2003 | Smith |
| 6,638,557 | B2 | 10/2003 | Qi |
| 6,649,188 | B2 | 11/2003 | Gilleland |
| 6,656,984 | B1 | 12/2003 | Haasmaa |
| 6,709,763 | B2 | 3/2004 | Fanta |
| 6,734,147 | B2 | 5/2004 | Levy |
| 6,755,915 | B1 | 6/2004 | Van Soest |
| 6,790,270 | B1 | 9/2004 | Billmers |
| 6,809,197 | B1 | 10/2004 | Woo |
| 6,818,717 | B2 | 11/2004 | Kantamneni |
| 6,825,252 | B2 * | 11/2004 | Helbling et al. ............... 524/47 |
| 6,852,349 | B2 | 2/2005 | Smith |
| 6,933,335 | B2 | 8/2005 | Berger |
| 6,953,597 | B2 | 10/2005 | Thorpe |
| 6,958,369 | B2 | 10/2005 | Berger |
| 6,962,950 | B1 | 11/2005 | Bastioli |
| 7,019,054 | B2 | 3/2006 | Dixit |
| 7,052,776 | B2 | 5/2006 | Fanta |
| 7,070,865 | B2 | 7/2006 | Berube |
| 7,157,573 | B2 | 1/2007 | Buwalda |
| 7,687,477 | B2 * | 3/2010 | Mikkonen et al. ............. 514/54 |
| 2001/0021733 | A1 * | 9/2001 | Peltonen et al. ............... 524/47 |
| 2002/0142031 | A1 | 10/2002 | Gilleland |
| 2002/0169086 | A1 | 11/2002 | Levy |
| 2002/0198113 | A1 | 12/2002 | Levy |
| 2002/0198114 | A1 | 12/2002 | Levy |
| 2003/0013615 | A1 | 1/2003 | Levy |
| 2004/0029748 | A1 | 2/2004 | Levy |
| 2004/0131740 | A1 * | 7/2004 | Woodhouse et al. ......... 426/549 |
| 2004/0138072 | A1 | 7/2004 | Levy |
| 2004/0167038 | A1 | 8/2004 | Levy |
| 2004/0167043 | A1 | 8/2004 | Levy |
| 2005/0008736 | A1 | 1/2005 | Egan |
| 2005/0008801 | A1 | 1/2005 | Kippenhahn |
| 2005/0061203 | A1 * | 3/2005 | Helbling et al. ........... 106/145.1 |
| 2005/0100695 | A1 | 5/2005 | Holbert |
| 2005/0197259 | A1 | 9/2005 | Levy |
| 2006/0019851 | A1 | 1/2006 | Hecht |

* cited by examiner

LECITHIN-STARCHES COMPOSITIONS, PREPARATION THEREOF AND PAPER PRODUCTS HAVING OIL AND GREASE RESISTANCE, AND/OR RELEASE PROPERTIES

This application claims the priority of provisional U.S. Patent Application Ser. No. 60/733,636, filed Nov. 4, 2005, the entire contents of which are incorporated herein.

FIELD OF THE DISCLOSURE

The present disclosure is directed to compositions comprising at least two starches and lecithin. Also the present disclosure is directed to processes for producing the compositions. Moreover, the present disclosure is related to uses of the compositions herein in the preparation of paper products that have oil and grease resistance, and/or have release properties.

BACKGROUND

It is well known that various starch compositions have been used as additives in the production of paper. For example, starch compositions have been used in the production of paper products for purposes of strength enhancement, and other purposes. It is desirable to provide starch compositions that may be useful in the production of paper products that have oil and grease resistance, and/or have release properties. The resulting paper products having the characteristics of oil and grease resistance, and/or release properties have utility in many applications. For example, the paper products could be useful in food packaging, oil and grease resistance food containers, release paper for frozen foods, and the like.

SUMMARY OF THE DISCLOSURE

The present disclosure is directed to compositions comprising at least two or more different starches and lecithin. The present disclosure is also directed to processes for producing the starch-lecithin compositions described herein. The present disclosure further is directed to uses of the compositions herein in the production of paper products having the characteristics of oil and grease resistance, and/or release properties. Also, the present disclosure is directed to the paper products that are particularly suited for use in the various applications where oil and grease resistance, and/or release properties are pertinent.

DETAILED DESCRIPTION OF THE DISCLOSURE

The present disclosure is directed to compositions comprising at least two or more different starches and lecithin. The present disclosure is also directed to processes for producing the starch-lecithin compositions described herein. The present disclosure further is directed to uses of the compositions herein in the production of paper products having the characteristics of oil and grease resistance, and/or release properties. Also, the present disclosure is directed to the paper products that are particularly suited for use in the various applications where oil and grease resistance, and/or release properties are pertinent.

The starch-lecithin compositions of the present disclosure comprise at least two or more starches and lecithin. As used herein, lecithins generally are a complex, naturally occurring mixture of phospholipids and other polar lipids. The lecithins may comprise glycerols, fatty acids, phosphoric acid, amino alcohols, carbohydrates, and the like. Fractionated lecithins are lecithins that are separated into subclasses or enriched fractions of lecithins. The enriched fractions may be a mixture enriched in phospholipids such as phosphatidyl choline, phosphatidyl ethanolamine, phosphatidyl inositol, phosphatidyl serines, phosphatidyl glycerol, phosphatidic acid, and the like. In preparing the compositions, at least two or more starches are required. Any starch may be used as the starches of the composition provided the starches differ.

In preparing the compositions, the lecithin is utilized in any amount. Typically, the lecithin is utilized in an amount ranging from about 0.1% to about 99.9% by weight, based on the weight of the composition. In one embodiment, the lecithin is utilized in an amount ranging from about 1% to about 50% by weight, and in another embodiment, the amount ranges from about 5% to about 20% by weight. The starches are used in the composition in any amount ranging from about 0.1% to about 99.9% by weight, based on the weight of the composition. The starches that comprise the starch component of the composition may be present in any amount. For example, a first starch of the starch component may be present in an amount ranging from about 1% to about 99% by weight based on the starch component. A second starch of the starch component may be present in an amount ranging from about 1% to about 99% by weight based on the starch component. Typically, the starch component comprises from about 10% to about 30% of one starch and from about 70% to about 90% of a second starch of the starch component.

In the present compositions, the starches may be derived from any suitable source such as dent corn starch, waxy corn starch, potato starch, wheat starch, rice starch, sago starch, tapioca starch, sorghum starch, sweet potato starch, and mixtures thereof.

In more detail, at least one of the starches may be an unmodified starch, or a starch that has been modified by a chemical, physical, or enzymatic modification.

Chemical modification includes any treatment of a starch with a chemical that results in a modified starch. Within chemical modification are included, but not limited to, depolymerization of a starch, oxidation of a starch, reduction of a starch, etherification of a starch, esterification of a starch, nitrification of a starch, defatting of a starch, hydrophobization of a starch, and the like. Chemically modified starches may also be prepared by using a combination of any of the chemical treatments. Examples of chemically modified starches include the reaction of alkenyl succinic anhydride, particularly octenyl succinic anhydride, with starch to produce a hydrophobic esterified starch; the reaction of 2,3-epoxypropyltrimethylammonium chloride with starch to produce a cationic starch; the reaction of ethylene oxide with starch to produce hydroxyethyl starch; the reaction of hypochlorite with starch to produce an oxidized starch; the reaction of an acid with starch to produce an acid depolymerized starch; defatting of a starch with a solvent such as methanol, ethanol, propanol, methylene chloride, chloroform, carbon tetrachloride, and the like, to produce a defatted starch.

Physically modified starches are any starches that are physically treated in any manner to provide physically modified starches. Within physical modification are included, but not limited to, thermal treatment of the starch in the presence of water, thermal treatment of the starch in the absence of water, fracturing the starch granule by any mechanical means, pressure treatment of starch to melt the starch granules, and the like. Physically modified starches may also be prepared by using a combination of any of the physical treatments. Examples of physically modified starches include the thermal treatment of starch in an aqueous environment to cause the starch granules to swell without granule rupture; the thermal treatment of anhydrous starch granules to cause polymer rearrangement; fragmentation of the starch granules by mechanical disintegration; and pressure treatment of starch granules by means of an extruder to cause melting of the starch granules.

Enzymatically modified starches are any starches that are enzymatically treated in any manner to provide enzymatically modified starches. Within enzymatic modification are included, but not limited to, the reaction of an alpha amylase with starch, the reaction of a protease with starch, the reaction of a lipase with starch, the reaction of a phosphorylase with starch, the reaction of an oxidase with starch, and the like. Enzymatically modified starches may be prepared by using a combination of any of the enzymatic treatments. Examples of enzymatic modification of starch include the reaction of alpha-amylase enzyme with starch to produce a depolymerized starch; the reaction of alpha amylase debranching enzyme with starch to produce a debranched starch; the reaction of a protease enzyme with starch to produce a starch with reduced protein content; the reaction of a lipase enzyme with starch to produce a starch with reduced lipid content; the reaction of a phosphorylase enzyme with starch to produce an enzyme modified phosphated starch; and the reaction of an oxidase enzyme with starch to produce an enzyme oxidized starch.

Suitable examples of chemically modified starch that may be utilized herein include, but are not limited to, a hydrophobized starch, a cationic starch, a crosslinked starch, a cationic crosslinked starch, an oxidized starch, a hydroxyalkyl starch, an esterified starch, a grafted starch interpolymer, or mixtures thereof.

The hydrophobized starch may be any hydrophobized starch. This includes any starch that is modified in any known manner to render the starch hydrophobized. The term, hydrophobized starch, as used herein, is defined as any starch that will absorb water to an extent less than that of the starch material that has not been hydrophobized.

For example, a suitable method for preparing a hydrophobized starch is as follows. The starch to be hydrophobized may be any starch. The starch can be modified by introducing a functional group that hydrophobizes the starch, such as an amine, an ester, or an ether. Alternatively, the starch may be chemically, physically, or enzymatically treated prior to hydrophobizing the starch. Furthermore, a hydrophobized starch may be prepared by introducing any functional group such as an amine, an ester, or an ether, to any starch, prior or subsequent to hydrophobizing the starch.

In more detail, in hydrophobizing a starch, any known manner may be utilized. For example, the starch may be esterified or etherified, or the like, to achieve hydrophobicity. Suitable for use as modifying agents to render starches hydrophobized are, but not limited to, an aryl-, alkyl-, alkenyl-, aralkyl-, aralkenyl-anhydride; an aryl-, alkyl-, alkenyl-, aralkyl-, aralkenyl-halogen; an aryl-, alkyl-, alkenyl-, aralkyl-, aralkenyl-ketene dimer; an aryl-, alkyl-, alkenyl-, aralkyl-, aralkenyl-epoxide; an aryl-, alkyl-, alkenyl-, aralkyl-, aralkenyl-ester and acid halide derivatives of carboxylic acids, intramolecular combinations thereof, and mixtures thereof. Suitable modifying agents for hydrophobizing the starches are alkenyl succinic anhydrides, particularly octenyl succinic anhydride. Grafted starch interpolymers are also suitable hydrophobized starches.

Suitable for use in the present compositions may be any cationic starch. A starch of any source may be used as the starch that is rendered cationic. Cationic starches may be produced by any conventional manner. For example, the cationic starches may be produced by a chemical reaction of the starch with a modifying agent containing an amino, imino, ammonium, sulfonium, or phosphonium group. The chemical reaction may be an esterification or etherification reaction. Suitable for use are the primary, secondary, tertiary or quaternary amino groups, with the tertiary amino and quaternary ammonium starch ethers, such as the quaternary amino alkyl ether of starch, more preferred. If desired, the cationic starch may be treated in any conventional manner with known treating agents to render the cationic starches hydrophobized.

The oxidized starch that may be used in the starch compositions of the present disclosure may be any oxidized starch. Oxidized starch may be produced in any conventional manner by the reaction of any starch with any oxidizing agent. Examples of suitable oxidizing agents include metal salts of hypochlorite, metal salts of permanganate, hydrogen peroxide, organic peroxides, peracids, and the like, and mixtures thereof. For example, dent corn starch may be reacted with sodium hypochlorite solution under alkaline pH conditions for a length of time sufficient to achieve a product suitable for use as an oxidized starch.

Hydroxyalkyl starches that may be used in the present compositions, such as hydroxyethyl starch, hydroxypropyl starch, and hydroxybutyl starch may be produced by any conventional manner. For example, hydroxyethyl starch may be produced by the etherification of any starch with ethylene oxide. Similarly, hydroxypropyl starch may be produced by the etherification of any starch with propylene oxide. In both instances, the starch is treated with the alkylene oxide, under alkaline pH conditions, for a length of time sufficient to achieve a product suitable for use as a hydroxyalkyl starch.

Any grafted starch interpolymer may be used in the starch compositions of the present disclosure. The grafting of the starch is a chemical modification of the starch. Additionally, in preparing the grafted starch interpolymer, the starch component may be chemically, physically, and/or enzymatically modified at the time of the interpolymerization. The grafted starch interpolymer is produced using any conventional manner for interpolymerizing a starch with one or more monomers. The one or more components that is interpolymerized with the starch, may be any suitable monomer. Exemplary of suitable monomers include, but are not limited to, the following: vinyl monomers such as alkyl acrylates, hydroxylated alkyl acrylates, alkyl methacrylates, hydroxylated alkyl methacrylates, alkyl vinyl ketones, substituted acrylamides, methacrylic acid, crotonic acid, itaconic acid, fumaric acid, maleic acid, maleic anhydride, vinyl halides, vinylidene halides, vinyl esters, vinyl ethers, vinyl carbazole, N-vinyl pyrrolidone, chlorostyrene, alkyl styrene, ethylene, propylene, isobutylene, vinyl triethoxysilane, vinyl diethylmethylsilane, vinyl methyldichlorosilane, triphenyl vinylsilane, 1-vinyl-1-methylsila-14-crown-5. Also suitable for use are dienes such as, 1,3-butadiene, isoprene, chloroprene, cyclobutadiene, and divinyl benzene.

The grafted starch interpolymers may be produced utilizing any conventional manner. For example, a starch may be grafted with at least one or more monomer, in the presence of a free radical initiator. The starch utilized herein may be used in any form such as, for example, gelatinizing the starch to form a starch paste, that is thereafter reacted with at least one monomer. Any suitable temperature and/or pressure may be employed in the reaction. Any suitable ratio of the components utilized in preparing the grafted starch interpolymer may be used. Any suitable free radical initiator may be used provided that the free radical initiator acts to interpolymerize and graft the monomers. Exemplary of such initiators are organic and inorganic peroxy compounds, and azo compounds.

An esterified starch may be produced utilizing any conventional manner. For example, any starch source may be reacted with suitable esterifying agents such as, aryl-, alkyl-, alkenyl-, aralkyl-, aralkenyl-anhydrides, aryl-, alkyl-, alkenyl-, aralkyl-, aralkenyl-ester and acid halide derivatives of carboxylic acids, intramolecular combinations thereof, and mixtures thereof. In particular, any starch source may be reacted with acetic anhydride to produce an acetylated starch product.

Suitable for use as the starch component of the starch compositions herein, include, but are not limited to, starch components where the individual starches are different; starch components of the starch composition where the individual starches are obtained from different starch sources; starch components of the starch compositions where the individual starches are modified differently; starch components of the starch compositions where the individual starches are chemically modified differently; starch components of the starch compositions where the individual starches are physically modified differently; starch components of the starch compositions where the individual starches are enzymatically modified differently; starch components of the starch composition where the individual starches have different viscosities.

Further examples of suitable starch components of the starch compositions are as follows: the starch component comprises hydroxyethyl starch and hydrophobized starch; the starch component comprises hydroxyethyl starch and cationized starch; the starch component comprises acid depolymerized starch and hydrophobized starch; the starch component comprises a hydrophobized starch and oxidized starch; the starch component comprises cationic starch and oxidized starch; the starch component comprises oxidized starch and acid depolymerized starch; the starch component comprises dextrin and hydroxyethyl starch; the starch component comprises hydroxyethyl waxy starch and hydroxyethyl dent starch; the starch component comprises cationic waxy starch and cationic potato starch; the starch component comprises cationic waxy starch and hydroxyethyl dent starch; the starch component comprises cationic crosslinked waxy starch and cationic crosslinked dent starch; the starch component comprises cationic crosslinked potato starch and cationic crosslinked waxy starch; the starch component comprises vinyl grafted interpolymer starch and hydroxyethyl starch; the starch component comprises phosphorylase modified starch and cationic starch; and the like.

All of the above starch components that are suitable for use in the present starch compositions may be mixed with lecithin in any manner and in any amount described above. Typically, the starch components and the lecithin are combined by physical mixing. For example, at least one of the starches of the starch component of the composition may be in dry form when mixed together. Alternately, at least one of the starches of the starch component of the composition may be in slurry form when mixed to form the composition. Alternately, at least one of the starches of the starch component of the composition may be in dry form, and at least one of the starches of the starch component of the composition may be in slurry form, when the starches are mixed to form a composition. Another acceptable method of mixing is to combine the gelatinized starch pastes after the individual starch suspensions have been gelatinized by a cooking process.

Any of the above-described procedures for preparing the starch component of the starch composition may be carried out in the absence of lecithin, or in the presence of lecithin.

For example, the composition comprising the starch component and the lecithin may be formed by the following technique. The starch component is mixed with water to form a first slurry. Thereafter, the first slurry is mixed with lecithin to form a second slurry that is heated to form a gelatinized paste composition. In forming the first slurry, there is generally utilized enough water to form a slurry having a solids content of about 5% to about 40%. The lecithin is mixed with the slurry in any known manner. The lecithin containing slurry is then heated to form a gelatinized paste composition at a temperature generally above 80° C.

The compositions herein comprising the starches and lecithin are useful for many purposes and applications. For example, the starch-lecithin compositions are useful in producing paper products that have oil and grease resistance, and/or have release properties. The starch-lecithin compositions may also have utility in producing foods and beverages. The starch-lecithin compositions of the present disclosure may include any conventional additives. For example, there may be incorporated dyes, sizing additives, retention and drainage aids, aqueous suspensions or solutions of biopolymers or synthetic polymers, and the like. There may also be incorporated any conventional additives used in foods and beverages.

The compositions comprising the starches and lecithin may be utilized in the production of paper products having oil and grease resistance. Oil and grease resistant paper products generally refer to the ability of the paper product to resist the penetration of oil and grease, usually derived from foods containing vegetable and animal fats, contacting the surface of the paper product.

In preparing the paper products having oil and grease resistance, the compositions comprising at least two starches and lecithin may be incorporated into the cellulosic pulp during the paper manufacturing process. In one embodiment, the composition comprising the starches and the lecithin are heated to form a gelatinized starch paste composition, typically at a temperature above 80° C. The gelatinized starch paste composition may then be introduced into a cellulosic pulp, particularly a paper furnish, in any known manner. In doing so, the gelatinized starch paste composition may be introduced at the wet-end of a paper machine in a paper fiber thick stock, or a paper fiber thin stock, or a split addition to both the thick stock and thin stock. In introducing the gelatinized starch paste composition to the cellulosic pulp, any amount of the composition may be incorporated as desired. Generally, the composition is incorporated into the cellulosic pulp in an amount ranging from greater than zero to about 10% by weight of the dry cellulosic pulp.

In another embodiment in the preparation of paper products having oil and grease resistance, a composition comprising the starches and lecithin is contacted with the surfaces of a paper product. The paper product may be any paper product, such as paper or paperboard, or the like. In a preferred embodiment the composition of the present disclosure may be incorporated into a pre-formed cellulosic web in the following manner. The composition is slurried in water and the resultant slurry is heated at a temperature sufficient to achieve gelatinization of the starch slurry, to produce a gelatinized starch paste composition. Typically, the heating to achieve gelatinization is carried out at a temperature above about 80° C. The starch paste composition may be incorporated into the pre-formed cellulosic web by using a size press tub, or gate roll applicator, spraying, or calendar stack application. The cellulosic web having the starch composition incorporated therein is then dried in any manner, thereby producing a cellulosic web paper product. In producing the paper products having oil and grease resistance, the composition comprising the starches and lecithin is contacted with the paper product in one embodiment in an amount sufficient to produce a paper product comprising greater than zero to about 10% by weight of the composition based on the paper product.

The compositions comprising the starches and lecithin may be utilized in the production of paper products having release properties. Release properties of paper products generally refer to the ability of the paper product to separate from another surface, such as frozen foods, baked foods, adhesive labels, and the like. The release properties of paper product include the amount of force required to separate the paper from a substrate to which paper has been adhered. The lower the amount of force required for separation of the paper from substrate, the better is the release characteristic. In addition, the release properties of paper products include the degree to which paper product remains substantially the same as the original paper product, after the paper product has been separated from a substrate to which the paper product has been adhered. The higher the degree to which the paper that is separated from substrate remains the same as the original paper adhered to the substrate, the better is the release characteristic.

In preparing the release paper products, the compositions comprising at least two starches and lecithin may be incorporated into the cellulosic pulp during the paper manufacturing process. The composition comprising the starches and the lecithin are heated to form a gelatinized starch paste composition, typically at a temperature above 80° C. The gelatinized starch paste composition may then be introduced into a cellulosic pulp, particularly a paper furnish, in any known manner. In doing so, the gelatinized starch paste composition may be introduced at the wet-end of a paper machine in a paper fiber thick stock, or a paper fiber thin stock, or a split addition to both the thick stock and thin stock. In introducing the gelatinized starch paste composition to the cellulosic pulp, any amount of the composition may be incorporated as desired. Generally, the composition is incorporated into the cellulosic pulp in an amount ranging from greater than zero to about 10% by weight of the dry cellulosic pulp.

In another embodiment in the preparation of release paper products, a composition comprising the starches and lecithin is contacted with the surfaces of a paper product. The paper product may be any paper product, such as paper or paperboard, or the like. In one embodiment the composition of the present disclosure may be incorporated into a pre-formed cellulosic web in the following manner. The composition is slurried in water and the resultant slurry is heated at a temperature sufficient to achieve gelatinization of the starch slurry, to produce a gelatinized starch paste composition. Typically, the heating to achieve gelatinization is carried out at a temperature above about 80° C. The starch paste composition may be incorporated into the pre-formed cellulosic web by using a size press tub, or gate roll applicator, spraying, or calendar stack application. The cellulosic web having the starch composition incorporated therein is then dried in any manner, thereby producing a cellulosic web paper product. In producing the release paper products, the composition comprising the starches and lecithin is contacted with the paper product in one embodiment in an amount sufficient to produce a paper product comprising greater than zero to about 10% by weight of the composition based on the paper product.

The following examples are presented to illustrate the present disclosure and to assist one of ordinary skill in making and using the same. The examples are not intended in any way to otherwise limit the scope of the disclosure.

EXAMPLES

Test Procedures

Viscosity

Viscosity was determined in accordance with the Standard Analytical Methods of the Corn Refiners Association, Inc. Test Procedure CRA-B-54. The instrument utilized in determining viscosity was a Brookfield DV-II+ viscometer.

Oil and Grease Resistance (OGR)

Oil and Grease Resistance was determined in accordance with TAPPI Test Method T 559 pm-96, 3M Kit Test. The Kit values were determined on two samples per condition, with a minimum of 4 tests per sample and a maximum of 9 tests per sample. The individual test values were then averaged.

Releasability

A) Determination of weight change of paper after separation from a substrate to which the paper has been applied.

In this procedure, a composition of two or more starches, or a composition comprising the same two or more starches and lecithin, is incorporated in a paper sheet. The paper is cut into samples having a size of approximately 5×7 cm. The 5×7 cm sample of paper is weighed using any balance, such as in this instance, an AT261 DELTARANGE available from METTLER TOLEDO. The paper sample may be applied to any substrate, such as tape or food. In this instance, a tape was applied to the paper sample. The tape used in this instance is SCOTCH 375 packaging tape available from 3M. The tape is cut into approximately 3.5×5 cm samples. Before applying the tape to the paper, one edge of the tape sample is folded to approximately 0.5 cm to provide a convenient grasping point for later separation from the paper. The tape sample is applied to the paper sample and pressed 2 times using a couch roll as described in TAPPI Method T205 sp-95. The tape sample is separated from the paper sample manually by hand. In doing so, a glass rod is placed against the adhesive side of the tape sample and the rod and the tape are pulled at substantially uniform pressure. The paper that is separated from the tape is weighed using the same balance to determine if there is any change in weight as compared with the starting paper sample.

For the purpose of the evaluation of oil and grease resistance (OGR) and weight change, of the samples produced in the Examples, paper products were produced. The paper samples having a size of 5.5×8.25 cm were used in the evaluations. For each of the samples, the resultant starch-lecithin paste compositions were drawn onto a paper surface with a K-Hand Coater, available from R.K. Print Coat Instrument Ltd. The starch pastes were applied to a paper surface and drawn with a #1 K-Bar to spread the starch-lecithin paste layer evenly on the paper. The resultant paper was dried on an Emerson Speed Dryer, available from Emerson Apparatus, at a temperature of 95° C. to 105° C. for about 3-5 minutes. The resultant samples were stored for 3 days to equilibrate to the laboratory conditions of temperature about 22° C. and humidity about 50%, for the evaluation. Data is reported in Table 1 and 2.

B) Peel Force—Peel force is a test procedure for determining the amount of force required to separate surfaces.

In carrying out the test, paper samples having a size of 5×14 cm were used. For each of the paper samples, the resultant starch-lecithin paste compositions were drawn onto a paper surface with a K-Hand Coater, available from R.K. Print Coat Instrument Ltd. The starch pastes were applied to a paper surface and drawn with a #1 K-Bar to spread the starch-lecithin paste layer evenly on the paper. The resultant paper was dried on an Emerson Speed Dryer, available from Emerson Apparatus, at a temperature of 95° C. to 105° C. for about 3-5 minutes. The resultant samples were stored for 3 days to equilibrate to the laboratory conditions of temperature about 22° C. and humidity about 50%, for the evaluation.

The paper sample is applied to any substrate, such as tape or food. In this instance, a tape was applied to the paper sample. The tape used in this instance is SCOTCH 810 tape (19 mm width) available from 3M. The tape is cut into lengths approximately 18 cm. Before applying the tape to the paper, one edge of the tape sample is folded to approximately 2 cm to provide a convenient grasping point for attachment to the analyzer. The tape sample is applied to the paper sample and pressed 10 times using a couch roll as described in TAPPI Method T205 sp-95. During the pressing, there was used a rubber mat underneath the paper sample and a blotter paper on top of the paper sample.

Peel force was measured using a TA-XT2i texture analyzer available from TEXTURE TECHNOLOGIES CORPORATION using a TA96 Tensile Test Fixture for T-peel testing. Peeling speed was 5 millimeter/second for the 100 millimeter distance. Average peel force is reported in Table 3.

Example 1

Addition of Lecithin to a 12% HYDROSHIELD 55 Starch Slurry

There was used in this example as the starch component, HYDROSHIELD 55 starch, available from CARGILL, Inc., an 80:20 mixture of hydroxyethylated starch and octenyl succinic anhydride modified starch. The hydroxyethylated starch has a viscosity of 400 cP at 23% solids at 49° C., and the octenyl succinic anhydride modified starch has a viscosity of 490 cP at 2% solids at 49° C. using the Corn Refiners Association, Inc Test Procedure CRA-B-54.

360 g (oven dried weight) of HYDRSHIELD 55 was mixed with sufficient deionized water to produce a 3000 g starch slurry sample. To 500 g of the starch slurry sample, there was added individual samples of lecithin in amounts of 5%, 10%, and 20%, based on the dry weight of starch in the slurry, to provide three separate samples. The lecithin utilized was LECIGRAN 1000P powder, available from CARGILL, Inc. The lecithin was added with stirring using a mechanical stirrer. Following addition of the lecithin, the resulting slurry was then stirred for an additional 10 minutes. Subsequently, the starch-lecithin slurry was cooked for 22 minutes in a boiling water bath with stirring to form a paste of the starch-lecithin composition. Thereafter, the resultant paste was cooled to room temperature (22° C.). The solids content of the cooked paste containing no lecithin was 12.69%. The solids content of the cooked paste containing 5% lecithin was 12.35%. The solids content of the cooked paste containing 10% lecithin was 12.65%. The solids content of the cooked paste containing 20% lecithin was 13.4%. Evaluation of the three starch-lecithin pastes and the control in the preparation of paper products is reported in the following TABLE 1.

Example 2

Addition of Lecithin to HYDROSHIELD 55 Starch Paste

A 700 g sample of HYDROSHIELD 55 starch slurry was cooked for 25 minutes in a boiling water bath with stirring to form a cooked starch paste. The HYDROSHIELD 55 starch slurry was prepared as shown in example 1. The cooked starch paste had a solids content of 12.44%. The resulting cooked paste was cooled to room temperature. A 300 g sample of the resulting cooked starch paste was placed in a beaker. Two separate samples of LECIGRAN 1000P lecithin, in amounts of 5%, and 10% were added to separate 300 g samples of the cooked paste, with stirring. The resulting starch-lecithin pastes were stirred for 20 minutes. The solids content of the cooked paste containing 5% lecithin was 13.2%. The solids content of the cooked paste containing 10% lecithin was 13.55%. Evaluation of the resulting starch-lecithin paste compositions and the control in the preparation of paper products is reported in the following TABLE 1.

TABLE 1

| Sample | Average Oil and Grease Resistance Kit Value |
|---|---|
| Example 1 - 0% Lecithin | 3.6 |
| Example 1 - 5% Lecithin | 4.3 |
| Example 1 - 10% Lecithin | 4.6 |
| Example 1 - 20% Lecithin | 3.8 |
| Example 2 - 0% Lecithin | 3.6 |
| Example 2 - 5% Lecithin | 4.4 |
| Example 2 - 10% Lecithin | 4.0 |

From the above data in TABLE 1, the following is observed. The oil and grease resistance property of the paper products in which are incorporated compositions comprising two starches and lecithin, have improved oil and grease resistance, as compared with a control sample comprising paper containing the same two starches, in the absence of lecithin. This improvement is obtained both in the instances where the lecithin is added to the starch before being cooked and after the starch is cooked.

Example 3

Addition of Lecithin to Acid Thinned Waxy Starch/Hydrophobic Modified Starch Blend There was used in this example as the starch component an 80:20 mixture of CALIBER182 acid thinned waxy starch available from CARGILL, Inc. and octenyl succinic anhydride modified hydrophobic starch.

Octenyl succinic anhydride treated starch, that is hydrophobic, was prepared by the following method. An acid thinned waxy starch having a viscosity of about 200 cp (centipoise), as measured according to the Standard Analytical Methods of the Corn Refiners Association, Inc. CRA-B-54, except for the following: the sample was measured at 7% solids, and cooled to 49° C., was used. 200 grams of the acid thinned waxy starch was slurried in 340 ml of deionized water in a 2 L four neck round bottom flask. The flask was equipped with an inlet from a syringe pump for addition of octenyl succinic anhydride, an inlet connected to a pump for addition of 3% aqueous sodium hydroxide to adjust pH, a thermometer, and a mechanical stirrer. To the starch slurry was added, with stirring, at a rate of 3 ml/hr, and at a temperature of about 32° C. to 35° C., an amount of 6.18 grams of 2-octenyl-1-succinic anhydride, available from HEICO CHEMICALS INC. During the addition of the octenyl succinic anhydride, the pH of the slurry was maintained at 8.0 to 8.3, utilizing the 3% aqueous sodium hydroxide solution as needed. After the anhydride addition was completed, the slurry was stirred for an additional four hours while maintaining the pH at about 8.0 to 8.3, at a temperature of about 32° C. to 35° C. After completion of the reaction, the heating source was removed. The slurry was acidified to a pH of about 6.3, with a 5% hydrochloric acid solution. The slurry was filtered, and the resultant filter cake was washed three times, each time with 300 ml of deionized water, and then air-dried. The resultant octenyl succinic anhydride treated starch was determined to have an octenyl succinic acid content of 2.6% and a viscosity of about 490 cps, as measured according to the Standard Analytical Methods of the Corn Refiners Association, Inc. CRA-B-54, except for the following: the sample was heated to 90° C. for 4 minutes, cooled to 49° C. for 11 minutes, measured at 2% solids, using spindle 21, at 20 rpm (revolutions per minute).

The CALIBER 182 starch has a viscosity of 250 cP at 25% solids at 49° C.

A 220 g (oven dried weight) of the starch blend sample was mixed with sufficient deionized water to produce 2000 g of starch slurry sample. To a 500 g sample of starch slurry, there was added lecithin in an amount of 10% based on the dry weight of starch in the slurry. The lecithin was added to the slurry with stirring using a mechanical stirrer. Following the addition of the lecithin, the resulting slurry was then stirred for an additional 10 minutes. Subsequently, the starch-lecithin slurry was cooked for 22 minutes in a boiling water bath with stirring to form a paste of the starch-lecithin composition. As a control, a 500 g sample of the same starch slurry was cooked, but without addition of lecithin. Thereafter, the resultant pastes were cooled to room temperature (22° C.). The solids content of the cooked paste containing no lecithin was 11.7%. The solids content of the cooked paste containing 10% lecithin was 12.7%. For purposes of comparison, the solids content of the cooked paste containing 10% lecithin was also adjusted to the level of the control, which is 11.7%, from the value of 12.7%. This was done by diluting 200 g of the sample containing 10% lecithin, with a sufficient amount of deionized water, such that the solids content is 11.7%. The results of the evaluation of the starch blends, with and without lecithin, in paper are reported in TABLE 2.

Example 4

Addition of Lecithin to FILMFLEX 370 Starch Blend

There was used in this example as the starch component, FILMFLEX 370 starch, available from CARGILL, Inc. a 75:25 mixture of hydroxyethylated dent starch and hydroxyethylated waxy corn starch.

220 g (oven dried weight) of FILMFLEX 370 starch was mixed with deionized water to produce 2000 g of starch slurry sample. To a 500 g sample of the starch slurry sample, there was added lecithin in an amount of 15% based on the dry weight of starch in the slurry. The lecithin was added to the slurry with stirring using a mechanical stirrer. Following addition of the lecithin, the resulting slurry was then stirred for an additional 10 minutes. Subsequently, the starch-lecithin slurry was cooked for 22 minutes in a boiling water bath with stirring to form a paste of the starch-lecithin composition. As a control, a 500 g sample of the same starch slurry was cooked, but without addition of lecithin. Thereafter, the resultant paste was cooled to room temperature (22° C.). The solids content of the cooked paste containing no lecithin was 11.9%. The solids content of the cooked paste containing 15% lecithin was 13.8%. For purposes of comparison, the solids content of the cooked paste containing 15% lecithin was also adjusted to the level of the control, which is 11.9%, from the value of 13.8%. This was done by diluting 200 g of the sample containing 15% lecithin, with a sufficient amount of deionized water, such that the solids content is 11.9%. The results of the evaluation of the starch blends, with and without lecithin, in paper are reported in TABLE 2.

Example 5

Addition of Lecithin to Hydroxyethylated Waxy Starch/Cationic Waxy Starch Blend

There was used in this example as the starch component a 75:25 blend of FILMFLEX 480 hydroxyethylated waxy starch available from CARGILL, Inc. and CHARGE+310 cationic waxy starch available from CARGILL, Inc.

220 g (oven dried weight) of the starch blend was mixed with deionized water to produce 2000 g of starch slurry sample. To a 500 g sample of the starch slurry sample, there was added lecithin in an amount of 10% based on the dry weight of starch in the slurry. The lecithin was added to the slurry with stirring using a mechanical stirrer. Following addition of the lecithin, the resulting slurry was then stirred for an additional 10 minutes. Subsequently, the starch-lecithin slurry was cooked for 22 minutes in a boiling water bath with stirring to form a paste of the starch-lecithin composition. As a control, a 500 g sample of the same starch slurry were cooked, but without addition of lecithin. Thereafter, the resultant pastes were cooled to room temperature (22° C.). The solids content of the cooked paste containing no lecithin was 10.0%. The solids content of the cooked paste containing 10% lecithin was 11.0%.

The results of the evaluation of the starch blends, with and without lecithin, in paper are reported in TABLE 2.

TABLE 2

| Sample Information | | Oil and Grease Resistance Property OGR Kit Value | Releasability Property | | | |
|---|---|---|---|---|---|---|
| Sample | % Solids | | Weight of Paper before separation, g | Weight of Paper after separation, g | Weight Change, g | Weight Change, % |
| Example 3- 0% Lecithin | 11.7 | 2.7 | 0.1116 | 0.1114 | 0.0002 | 0.18 |
| Example 3- 10% Lecithin | 12.7 | 3.3 | 0.1183 | 0.1182 | 0.0001 | 0.08 |
| Example 3- 10% Lecithin | 11.7 | 3 | 0.137 | 0.1369 | 0.0001 | 0.07 |
| Example 4- 0% Lecithin | 11.9 | 1.4 | 0.1339 | 0.138 | −0.0041 | −3.06 |
| Example 4- 15% Lecithin | 13.8 | 2.6 | 0.1025 | 0.1025 | 0 | 0 |

TABLE 2-continued

| Sample Information | | Oil and Grease | Releasability Property | | | |
|---|---|---|---|---|---|---|
| | | | Weight of | Weight of | | |
| Sample | % Solids | Resistance Property OGR Kit Value | Paper before separation, g | Paper after separation, g | Weight Change, g | Weight Change, % |
| Example 4-15% Lecithin | 11.9 | 3.3 | 0.1222 | 0.1221 | 0.0001 | 0.08 |
| Example 5-0% Lecithin | 10 | 0.9 | 0.1122 | 0.112 | 0.0002 | 0.18 |
| Example 5-10% Lecithin | 11 | 2 | 0.1217 | 0.1215 | 0.0002 | 0.16 |

From the above data, it was observed that the oil and grease resistance properties of the paper products prepared using starch compositions including lecithin improved relative to paper products prepared using starch compositions in the absence of lecithin.

The data shows that the presence of lecithin enhances oil and grease resistance property of all starch compositions of examples 3-5. Of particular note are examples 4 and 5, where the starch composition controls have low values of oil and grease resistance property. In these examples, the presence of lecithin is shown to increase the level of the oil and grease resistance property to a greater degree.

From the above data, the following can be observed in regard to the releasability property. All of the examples 3-5, exhibit the least weight change value when the paper contains a starch composition that includes lecithin, with the degree of improvement in releasability more significant in the case of examples 3 and 4. Having a paper, following separation from a substrate, that is as similar as possible to the starting paper is beneficial. The weight change is a means of demonstrating the similarity of the paper products, before and after separation. Where the paper is characterized by a small weight change, it may be concluded that the separation of the paper from the substrate is a cleaner separation.

Example 6

Addition of Lecithin Slurry to HYDROSHIELD 55 Starch Paste 240 g (oven dried weight) of HYDROSHIELD 55 starch, available from CARGILL, Inc, was mixed with deionized water to produce 2000 g of starch slurry sample. The resulting slurry was then stirred for an additional 10 minutes. Subsequently, the starch slurry was cooked for 22 minutes in a boiling water bath with stirring to form a gelatinized paste of the starch. Thereafter, the resultant paste was cooled to room temperature (22° C.). The solids content of the cooked paste was 12.38%. The starch paste was diluted with deionized water to produce a cooked paste having a solid content of 11%.

To 200 of starch paste, there was added 11 g of 10% lecithin slurry to produce a 5% lecithin-starch component. The 10% lecithin slurry was prepared by mixing 20 g of LECIGRAN 1000P lecithin, available from CARGILL, Inc, with 180 g of deionized water for 16 hours. In a similar manner, 44 g of 10% lecithin slurry was added to 200 g of starch paste to produce a 20% lecithin-starch component. Both lecithin-starch components were shaken for 10 minutes. As a control, a starch paste was used without adding any lecithin. The data are reported in TABLE 3.

Example 7

Addition of Lecithin Slurry to Acid Thinned Waxy Starch/Hydrophobic Modified Starch Paste 220 g (oven dried weight) of acid thinned waxy starch/hydrophobic modified starch blend as described in example 3 was mixed with deionized water to produce 2000 g of starch slurry sample. The resulting slurry was then stirred for an additional 10 minutes. Subsequently, the starch slurry was cooked for 22 minutes in a boiling water bath with stirring to form a gelatinized starch paste. Thereafter, the resultant paste was cooled to room temperature (22° C.). The solids content of the cooked paste was 12.14% The starch paste was diluted with deionized water to produce a cooked paste having a solids content of 11%.

To 200 g of starch paste, there was added 44 g of 10% lecithin slurry to produce a 20% lecithin-starch component. The 10% lecithin slurry was prepared as shown in Example 6. The lecithin-starch component was shaken for 10 minutes. As a control, a starch paste was used without adding any lecithin. The data are reported in TABLE 3.

Example 8

Addition of Lecithin Slurry to FILMFLEX 370 Starch Paste 220 g of FILMFLEX 370 starch, available from CARGILL, Inc., was mixed with deionized water to produce 2000 g of starch slurry sample. The resulting slurry was then stirred for an additional 10 minutes. Subsequently, the starch slurry was cooked for 22 minutes in a boiling water bath with stirring to form a gelatinized starch paste. Thereafter, the resultant paste was cooled to room temperature (22° C.). The solids content of the cooked paste was 12.37%.

To 200 g of starch paste, there was added a 49.5 g of 10% lecithin slurry to produce a 20% lecithin-starch component. The 10% lecithin slurry was prepared as shown in Example 6. The lecithin-starch component was shaken for 10 minutes. As a control, a starch paste was used without adding any lecithin. The data are reported in TABLE 3.

TABLE 3

| Sample | % Weight of Lecithin based on Starch | Peel Force (g/millimeter) |
|---|---|---|
| Example 6 | 0 | 101.0 |
| | 5 | 12.3 |
| | 20 | 4.2 |
| Example 7 | 0 | 98.6 |
| | 20 | 2.0 |

TABLE 3-continued

| Sample | % Weight of Lecithin based on Starch | Peel Force (g/millimeter) |
|---|---|---|
| Example 8 | 0 | 111.9 |
| | 20 | 6.1 |

The above data indicate that the amount of force required to separate the paper and the tape is reduced when lecithin is incorporated with the starch blend.

The disclosure has been described with reference to various specific and illustrative embodiments and techniques. However, one skilled in the art will recognize that many variations and modifications may be made while remaining within the sprit and scope of the disclosure.

What is claimed is:

1. A process for producing an oil and grease resistant paper product, comprising incorporating a gelatinized starch paste composition comprising at least two starches that are different and lecithin into a cellulosic pulp wherein the lecithin is present in an amount ranging from about 5% to about 20% by weight based on the weight of the composition, wherein the two starches comprise about 10% to about 30% of a first starch and from about 70% to about 90% of a second starch, and wherein the first starch is a hydrophobicized starch.

2. The process according to claim 1, wherein the composition is incorporated in an amount ranging from greater than zero to about 10% by weight of the dry cellulosic pulp.

3. A paper product produced in accordance with the process of claim 1.

4. A process for producing an oil and grease resistant paper product, comprising contacting the paper product with a gelatinized starch paste composition comprising at least two starches that are different and lecithin, wherein the lecithin is present in an amount ranging from about 5% to about 20% by weight based on the weight of the composition, wherein the two starches comprise about 10% to about 30% of a first starch and from about 70% to about 90% of a second starch, and wherein the first starch is a hydrophobicized starch.

5. The process according to claim 4, wherein the paper product is contacted with an amount of the composition sufficient to produce a paper product comprising from greater than zero to about 10% by weight of the composition based on the paper product.

6. A paper product produced in accordance with the process of claim 4.

7. The process according to claim 1 or 4, wherein the starches are selected from the group consisting of dent corn starch, waxy corn starch, potato starch, tapioca starch, wheat starch, rice starch, sago starch, sorghum starch, sweet potato starch, and mixtures thereof.

8. The process according to claim 7, wherein at least one of the starches is etherified.

9. The process according to claim 8, wherein the etherified starch is a hydroxyalkyl starch.

10. The process according to claim 9, wherein the hydroxyalkyl starch is selected from the group consisting of hydroxyethyl starch, hydroxypropyl starch, hydroxybutyl starch, and mixtures thereof.

11. The process according to claim 10, wherein the hydroxyalkyl starch is hydroxyethyl starch.

12. The process according to claim 7, wherein the hydrophobized starch is an alkenyl succinic anhydride modified starch.

13. The process according to claim 12, wherein the alkenyl succinic anhydride modified starch is octenyl succinic anhydride modified starch.

14. The process according to claim 13, wherein the second starch is hydroxyethyl starch.

15. The process according to claim 7, wherein at least one of the starches is physically modified.

16. The process according to claim 15, wherein the physical modification is pressure treatment of at least one of the starches, wherein the pressure treatment is extrusion.

17. The process according to claim 15, wherein the physical modification is thermal treatment of at least one of the starches.

18. The process according to claim 7, wherein at least one of the starches is enzymatically modified.

19. The process according to claim 18, wherein the enzymatic modification of at least one of the starches is selected from the group consisting of reaction of starch with an alpha amylase enzyme, reaction of the starch with a protease enzyme, reaction of the starch with a lipase enzyme, reaction of the starch with a phosphorylase enzyme, reaction of the starch with an oxidase enzyme, and mixtures thereof.

20. The process according to claim 1 or 4, wherein the starches are mixed with water to form a first slurry, the lecithin is mixed with the resultant first slurry to form a second slurry, and the second slurry is heated to form a gelatinized paste composition.

21. The process according to claim 1 or 4, wherein the starches are mixed with water to form a first slurry, the first slurry is heated to form a gelatinized paste composition, and the lecithin is mixed with the resultant gelatinized paste composition.

22. An oil and grease resistant paper product comprising a paper coating or paper sizing composition, wherein said composition is a gelatinized starch composition and comprises at least two starches that are different and lecithin, wherein the lecithin in present in an amount ranging from about 5% to about 20% by weight based on the weight of the composition, wherein the two starches comprise from about 10% to about 30% of a first starch and from about 70% to about 90% of a second starch, and wherein the first starch is a hydrophobicized starch.

23. The paper product according to claim 22, prepared by incorporating the composition into a cellulosic pulp.

24. The paper product according to claim 22, wherein the starches are selected from the group consisting of dent corn starch, waxy corn starch, potato starch, tapioca starch, wheat starch, rice starch, sago starch, sorghum starch, sweet potato starch, and mixtures thereof.

25. The paper product according to claim 24, wherein at least one of the starches is etherified.

26. The paper product according to claim 25, wherein the etherified starch is a hydroxyalkyl starch.

27. The paper product according to claim 26, wherein the hydroxyalkyl starch is selected from the group consisting of hydroxyethyl starch, hydroxypropyl starch, hydroxybutyl starch, and mixtures thereof.

28. The paper product according to claim 27, wherein the hydroxyalkyl starch is hydroxyethyl starch.

29. The paper product according to claim 24, wherein the hydrophobized starch is an alkenyl succinic anhydride modified starch.

30. The paper product according to claim 29, wherein the alkenyl succinic anhydride modified starch is octenyl succinic anhydride modified starch.

31. The paper product according to claim 30, wherein the second starch is hydroxyethyl starch.

32. The paper product according to claim 24, wherein at least one of the starches is physically modified.

33. The paper product according to claim 32, wherein the physical modification is pressure treatment of at least one of the starches, wherein the pressure treatment is extrusion.

34. The paper product according to claim 32, wherein the physical modification is thermal treatment of at least one of the starches.

35. The paper product according to claim 24, wherein at least one of the starches is enzymatically modified.

36. The paper product according to claim 35, wherein the enzymatic modification of at least one of the starches is selected from the group consisting of reaction of starch with an alpha amylase enzyme, reaction of the starch with a protease enzyme, reaction of the starch with a lipase enzyme, reaction of the starch with a phosphorylase enzyme, reaction of the starch with an oxidase enzyme, and mixtures thereof.

37. A composition comprising at least two starches that are different and lecithin, wherein the lecithin is present in an amount ranging from about 5% to about 20% by weight based on the weight of the composition, wherein the two starches comprise from about 10% to about 30% of a first starch and from about 70% to about 90% of a second starch, and wherein the first starch is a hydrophobicized starch.

38. The composition according to claim 37, wherein the starches are selected from the group consisting of dent corn starch, waxy corn starch, potato starch, tapioca starch, wheat starch, rice starch, sago starch, sorghum starch, sweet potato starch, and mixtures thereof.

39. The composition according to claim 38, wherein at least one of the starches is etherified.

40. The composition according to claim 39, wherein the etherified starch is a hydroxyalkyl starch.

41. The composition according to claim 40, wherein the hydroxyalkyl starch is selected from the group consisting of hydroxyethyl starch, hydroxypropyl starch, hydroxybutyl starch, and mixtures thereof.

42. The composition according to claim 41, wherein the hydroxyalkyl starch is hydroxyethyl starch.

43. The composition according to claim 38, wherein the hydrophobized starch is an alkenyl succinic anhydride modified starch.

44. The composition according to claim 43, wherein the alkenyl succinic anhydride modified starch is octenyl succinic anhydride modified starch.

45. The composition according to claim 44, wherein the second starch is hydroxyethyl starch.

46. The composition according to claim 38, wherein at least one of the starches is physically modified.

47. The composition according to claim 46, wherein the physical modification is pressure treatment of at least one of the starches, wherein the pressure treatment is extrusion.

48. The composition according to claim 46, wherein the physical modification is thermal treatment of at least one of the starches.

49. The composition according to claim 38, wherein at least one of the starches is enzymatically modified.

50. The composition according to claim 49, wherein the enzymatic modification of at least one of the starches is selected from the group consisting of reaction of starch with an alpha amylase enzyme, reaction of the starch with a protease enzyme, reaction of the starch with a lipase enzyme, reaction of the starch with a phosphorylase enzyme, reaction of the starch with an oxidase enzyme, and mixtures thereof.

* * * * *

UNITED STATES PATENT AND TRADEMARK OFFICE
CERTIFICATE OF CORRECTION

PATENT NO.        : 7,931,778 B2
APPLICATION NO.   : 11/586475
DATED             : April 26, 2011
INVENTOR(S)       : Ki-Oh Hwang et al.

Page 1 of 1

It is certified that error appears in the above-identified patent and that said Letters Patent is hereby corrected as shown below:

Column 16, line 37 (Claim 22), please delete "in present" and insert --is present-- therefor.

Signed and Sealed this
Twenty-fifth Day of October, 2011

David J. Kappos
*Director of the United States Patent and Trademark Office*